(12) United States Patent
Hashimoto (10) Patent No.: US 9,771,848 B2
(45) Date of Patent: Sep. 26, 2017

(54) VEHICLE AND VEHICULAR CONTROL METHOD

(71) Applicant: Keita Hashimoto, Toyota (JP)

(72) Inventor: Keita Hashimoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/390,526

(22) PCT Filed: Oct. 23, 2012

(86) PCT No.: PCT/JP2012/077291
§ 371 (c)(1),
(2) Date: Oct. 3, 2014

(87) PCT Pub. No.: WO2014/064758
PCT Pub. Date: May 1, 2014

(65) Prior Publication Data
US 2015/0218995 A1    Aug. 6, 2015

(51) Int. Cl.
*F01N 3/20* (2006.01)
*B60W 10/30* (2006.01)
*F01N 9/00* (2006.01)

(52) U.S. Cl.
CPC ........... *F01N 3/2013* (2013.01); *B60W 10/30* (2013.01); *F01N 3/20* (2013.01); *F01N 3/2026* (2013.01); *F01N 9/00* (2013.01); *F01N 2900/1602* (2013.01); *F01N 2900/1628* (2013.01); *Y02T 10/26* (2013.01); *Y02T 10/47* (2013.01)

(58) Field of Classification Search
CPC .... F01N 2250/02; F01N 11/007; F01N 11/00; F01N 11/002; F01N 2610/02; F01N 3/2066; F01N 13/02; F01N 2610/03; F01N 13/0842; F02D 41/1441
USPC .......... 60/273, 274, 285, 286, 303; 422/179, 422/174; 73/114.69, 114.71, 114.75
See application file for complete search history.

(56) References Cited

U.S. PATENT DOCUMENTS

| 8,423,221 B2 | 4/2013 | Watanabe |
| 2009/0211233 A1 | 8/2009 | Watanabe et al. |

(Continued)

FOREIGN PATENT DOCUMENTS

| DE | 102009003469 A1 | 9/2009 |
| DE | 112010001368 T5 | 6/2012 |

(Continued)

OTHER PUBLICATIONS

JP 2012072665, Machine Translation, Translated Mar. 18, 2016.*
Machine Translation of JP 2010202012, Translated on Jul. 20, 2016.*

*Primary Examiner* — Patrick Maines
(74) *Attorney, Agent, or Firm* — Oliff PLC (57) ABSTRACT

An ECU executes a program including the steps of: determining whether an insulation resistance Ri is smaller than a threshold value Ri(0); if the insulation resistance Ri is smaller than the threshold value Ri(0), determining whether there is electric leakage between a vehicular body and an EHC and whether there is a possibility that there is electric leakage at a location other than a location between the vehicular body and the EHC; and if there is electric leakage between the vehicular body and the EHC, performing heating control.

5 Claims, 5 Drawing Sheets (56) References Cited

U.S. PATENT DOCUMENTS

| | | | | |
|---|---|---|---|---|
| 2012/0004801 A1* | 1/2012 | Watanabe | ............ | F01N 3/2026 |
| | | | | 701/22 |
| 2012/0260638 A1* | 10/2012 | Yoshioka | ............. | F01N 3/2013 |
| | | | | 60/295 |
| 2013/0008148 A1* | 1/2013 | Katsuta | ................ | B60W 10/26 |
| | | | | 60/274 |
| 2013/0140295 A1* | 6/2013 | Yoshioka | ................ | F01N 3/005 |
| | | | | 219/520 |
| 2013/0259754 A1 | 10/2013 | Murata et al. | | |
| 2014/0083084 A1* | 3/2014 | Fukuda | ................ | F02D 41/024 |
| | | | | 60/284 |
| 2014/0109556 A1* | 4/2014 | Hashimoto | ........... | B60L 3/0069 |
| | | | | 60/299 |
| 2014/0292350 A1* | 10/2014 | Yoshioka | ............. | F01N 3/2013 |
| | | | | 324/551 |
| 2015/0007551 A1* | 1/2015 | Tanaka | .................... | F01N 11/00 |
| | | | | 60/274 |

FOREIGN PATENT DOCUMENTS

| | | | |
|---|---|---|---|
| JP | A-10-2215 | | 1/1998 |
| JP | 2001098931 A | * | 4/2001 |
| JP | A-2001-98931 | | 4/2001 |
| JP | A-2006-26483 | | 2/2006 |
| JP | 2010202012 A | * | 9/2010 |
| JP | 2010216399 A | * | 9/2010 |
| JP | A-2010-202012 | | 9/2010 |
| JP | A-2010-223159 | | 10/2010 |
| JP | 201 2021 41 | * | 2/2012 |
| JP | A-2012-21419 | | 2/2012 |
| JP | 2012072665 A | * | 4/2012 |
| WO | 2010109304 A1 | | 9/2010 |
| WO | 2012/086013 A1 | | 6/2012 |
| WO | 2012/111102 A1 | | 8/2012 |

\* cited by examiner

VEHICLE AND VEHICULAR CONTROL METHOD

TECHNICAL FIELD

The present invention relates to a technique to minimize/prevent electric leakage in a catalyst device heated with electric power.

BACKGROUND ART

Japanese Patent Laying-Open No. 2010-202012 (PTD 1) discloses minimizing/preventing electric leakage caused when an electric heating catalyst (EHC) is energized. More specifically, the document discloses that when an environmental condition defined by external temperature, humidity, and atmospheric pressure corresponds to a predetermined condensation range, energizing the EHC is started to vaporize moisture, condensed water and the like in exhaust gas.

CITATION LIST

Patent Document

PTD 1: Japanese Patent Laying-Open No. 2010-202012

SUMMARY OF INVENTION

Technical Problem

However, the environmental condition corresponding to the condensation range does not necessarily lead to a condition causing electric leakage. Furthermore, an environmental condition which does not correspond to the condensation range does not necessarily lead to a condition which does not cause electric leakage. Accordingly, the technique disclosed in the above publication cannot provide appropriate control for minimization/prevention of electric leakage.

The present invention contemplates a vehicle and vehicular control method minimizing/preventing electric leakage in a catalyst device heated with electric power.

Solution to Problem

The present invention in one aspect provides a vehicle including: an engine; a power storage device electrically insulated from a vehicular body; a catalyst device heated with electric power of the power storage device to purify exhaust gas of the engine; and a control device for performing heating control to heat the catalyst device. The catalyst device is configured to be electrically insulated from the vehicular body. The control device performs the heating control when an insulation state is not held between the catalyst device and the vehicular body.

Preferably, the vehicle further includes a detection device to detect a resistance value between the catalyst device and the vehicular body and the control device performs the heating control to heat the catalyst device when the resistance value is smaller than a threshold value.

Still preferably, when the resistance value is smaller than the threshold value, the control device performs soot oxidation control to heat the catalyst device until a catalyst attains a temperature to oxidize soot between the catalyst device and an exhaust path of the engine.

Still preferably, when the resistance value is smaller than the threshold value, the control device performs vaporization control to heat the catalyst device until a catalyst attains a first temperature to vaporize moisture between the catalyst device and an exhaust path of the engine.

Still preferably, if the vaporization control does not recover the insulation state, the control device performs soot oxidation control to heat the catalyst device until the catalyst attains a second temperature to oxidize soot between the catalyst device and the exhaust path, and the second temperature is higher than the first temperature.

Still preferably, the control device raises the catalyst device's temperature by supplying the catalyst device with electric power.

Still preferably, the vehicle further includes a rotating electric machine receiving electric power from the power storage device to cause the vehicle to travel.

The present invention in another aspect provides a vehicular control method used for a vehicle including an engine, a power storage device electrically insulated from a vehicular body, and a catalyst device heated with electric power of the power storage device to purify exhaust gas of the engine. The catalyst device is configured to be electrically insulated from the vehicular body. The method includes the steps of: determining whether an insulation state is held between the catalyst device and the vehicular body; and performing heating control to heat the catalyst device when the insulation state is not held between the catalyst device and the vehicular body.

Advantageous Effects of Invention

According to the present invention, when an insulation state is not maintained between a catalyst device and a vehicular body, heating control can be performed to heat the catalyst device to vaporize moisture between an exhaust path and the catalyst device and oxidize soot therebetween. This can recover the insulation state between the catalyst device and the vehicular body. This can in turn minimize/prevent electric leakage between the catalyst device and the vehicular body. The present invention can thus provide a vehicle and vehicular control method minimizing/preventing electric leakage in a catalyst device heated with electric power.

DESCRIPTION OF EMBODIMENTS

Hereinafter reference will be made to the drawings to describe the present invention in embodiment. In the following description, identical components are denoted by identical reference characters. Their names and functions are also identical. Accordingly, they will not be described repeatedly in detail.

Figure 1:
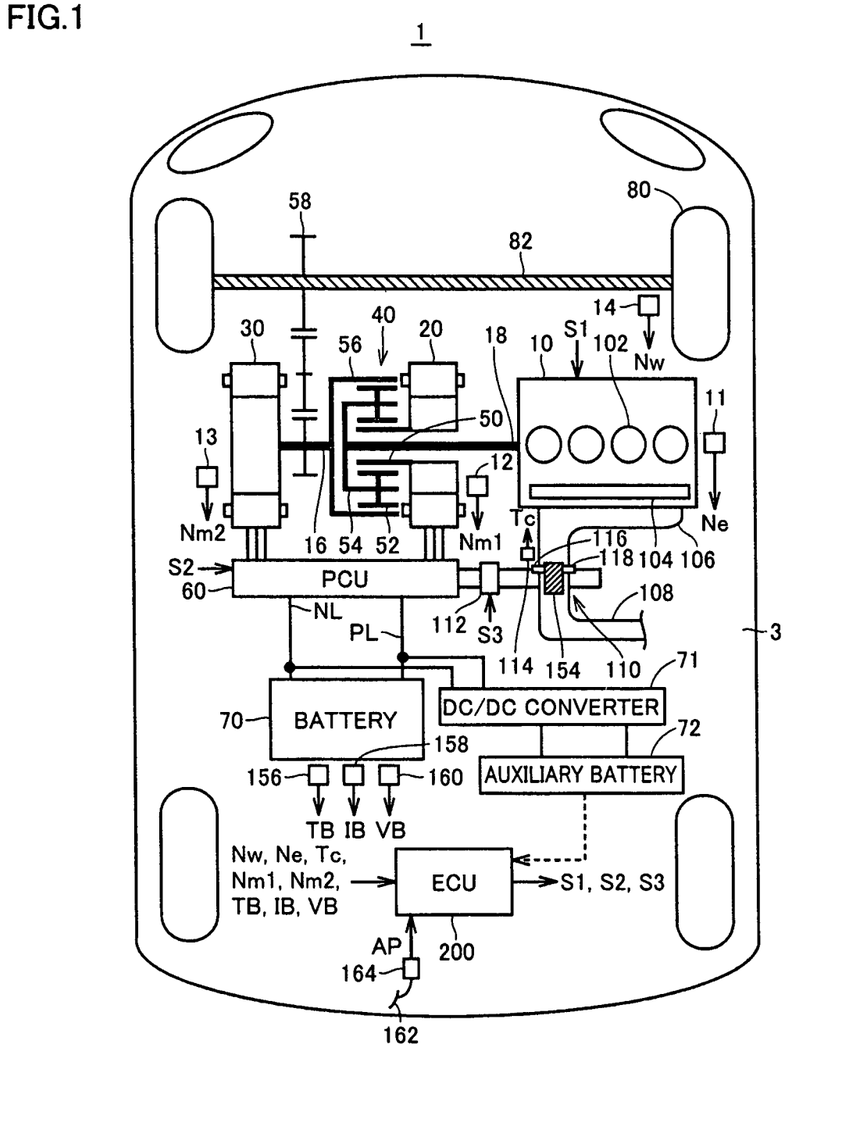
FIG. 1 is a general block diagram of a vehicle according to the present embodiment.

Reference will be made to FIG. 1 to describe a hybrid vehicle 1 (hereinafter also simply referred to as vehicle 1) according to the present embodiment in a general block diagram. Vehicle 1 includes a vehicular body 3, an engine 10, a driving shaft 16, a first motor generator (hereinafter referred to as first MG) 20, a second motor generator (hereinafter referred to as second MG) 30, a power split device 40, a speed reducer 58, a power control unit (PCU) 60, a battery 70, a DC/DC converter 71, an auxiliary battery 72, a driving wheel 80, and an electronic control unit (ECU) 200.

Vehicle 1 travels with driving force output from at least one of engine 10 and second MG 30. Engine 10 generates motive power which is in turn split for two paths by power split device 40. Of the two paths, one is a path for transmission via speed reducer 58 to driving wheel 80, and the other is a path for transmission to first MG 20.

First MG 20 and second MG 30 are, for example, three-phase ac rotating electric machines. First MG 20 and second MG 30 are driven by PCU 60.

First MG 20 has a function as a generator which uses the motive power of engine 10 split by power split device 40 to generate electric power to charge battery 70 therewith via PCU 60 and supplies electric power to an external electrical load as will be described later. In addition, first MG 20 receives electric power from battery 70 and thereby rotates an output shaft of engine 10, or a crankshaft 18. First MG 20 thus has a function as a starter to start engine 10.

Second MG 30 has a function as a driving motor using at least any one of electric power stored in battery 70 and electric power generated by first MG 20 to provide driving force for driving wheel 80. In addition, second MG 30 has a function as a generator using electric power generated through regenerative braking to charge battery 70 via PCU 60.

Engine 10 is, for example, an internal combustion engine such as a gasoline engine and a diesel engine.

Engine 10 includes a plurality of cylinders 102, a fuel injection device 104 that supplies fuel to each of the plurality of cylinders 102, an exhaust manifold 106, an exhaust path 108, an electrically heating catalyst device (EHC) 110, and a catalyst temperature sensor 114. Note that engine 10 only requires at least one cylinder 102.

Fuel injection device 104 operates in response to a control signal S1 received from ECU 200 to inject an appropriate amount of fuel for each cylinder timely and stop injecting fuel for each cylinder. Fuel injection device 104 injects fuel in an amount adjusted depending on when/how long it injects fuel.

Exhaust path 108 has one end connected to exhaust manifold 106. Furthermore, exhaust path 108 has the other end connected to a muffler (not shown). Exhaust path 108 has an intermediate portion provided with EHC 110. Exhaust path 108 is formed for example of stainless steel and equal in potential to vehicular body 3.

EHC 110 includes a catalyst 154 to purify exhaust gas, and a positive electrode 116 and a negative electrode 118 for energizing catalyst 154. Note that EHC 110 is not particularly limited in configuration and may be of any of various known configurations that can use electrodes 116 and 118 to energize catalyst 154 to raise catalyst 154 in temperature.

While the present embodiment is described with catalyst 154 heated by an EHC using electrodes 116 and 118, the catalyst may be heated in a different manner. For example, catalyst 154 may be heated by injecting fuel in an increased amount or introducing spark retard to raise exhaust gas's temperature.

Catalyst 154 is provided in a cylindrical form having a honeycomb structure. Positive electrode 116 is provided on an external surface of catalyst 154. Negative electrode 118 is geometrically identical to positive electrode 116. Negative electrode 118 is provided at a position opposite to positive electrode 116 with catalyst 154 posed therebetween. Note that the geometry of catalyst 154 is merely one example and it is not limited to the cylindrical form.

Figure 2:
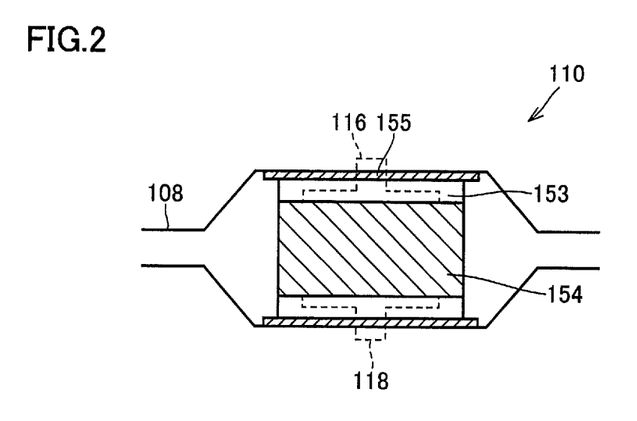
FIG. 2 shows a configuration of an EHC.

As shown in FIG. 2, catalyst 154 has the external surface with a mat 153 wound thereon in the form of a sheet. Mat 153 is formed of fluffy alumina fiber, for example. An insulating member 155 is provided between mat 153 and exhaust path 108. Insulating member 155 may be a member in the form of a sheet wound on the external surface of mat 153, or may be a member applied on an internal wall surface of exhaust path 108 for insulation. Insulating member 155 electrically insulates EHC 110 and exhaust path 108 (or vehicular body 3) from each other (hereinafter this state will also be referred to as "a/the insulation state").

Engine 10 emits exhaust gas which is in turn purified by catalyst 154 and subsequently discharged outside the vehicle. Catalyst 154 exhibits a purification effect when it is warmed up to a specific temperature range. Catalyst 154 is a three-way catalyst, for example.

Returning to FIG. 1, PCU 60 and EHC 110 are connected by a positive electrode line PL and a negative electrode line NL. EHC 110 receives via PCU 60 electric power from battery 70 and electric power generated by first MG 20. Note that battery 70 and EHC 110 may be connected in a relationship other than shown in FIG. 1.

Between PCU 60 and EHC 110 is provided a power supply circuit 112 having a relay incorporated therein and operative in response to a control signal S3 received from ECU 200 to electrically connect/disconnect EHC 110 and PCU 60. When power supply circuit 112 has the incorporated relay closed, EHC 110 and PCU 60 are connected to apply voltage to the EHC 110 positive electrode 116 and negative electrode 118. The electrical conduction to positive electrode 116 and negative electrode 118 generates Joule's heat in EHC 110 at catalyst 154 and thus heats catalyst 154 in EHC 110. When power supply circuit 112 has the incorporated relay opened, EHC 110 and PCU 60 are disconnected to stop electrical conduction to positive electrode 116 and negative electrode 118. ECU 200 thus controls power supply circuit 112 to control an amount of energization for catalyst 154 in EHC 110.

Note that ECU 200 may control PCU 60 to vary electric power (voltage/current) supplied to EHC 110 or may control duty for the relay incorporated in power supply circuit 112 to vary electric power supplied to EHC 110. Furthermore, power supply circuit 112 may be provided with a circuit to vary electric power supplied to EHC 110.

Catalyst temperature sensor 114 senses the temperature Tc of catalyst 154 in EHC 110 (hereinafter also referred to as "catalyst temperature Tc"). Catalyst temperature sensor 114 transmits to ECU 200 a signal indicating catalyst temperature Tc sensed.

Catalyst temperature Tc may be sensed by catalyst temperature sensor 114 directly. Alternatively, catalyst temperature Tc may be estimated by ECU 200 from the temperature of a member adjacent to EHC 110, the temperature of exhaust gas upstream of EHC 110, the temperature of exhaust gas downstream of EHC 110, or an operation history of engine 10.

Furthermore, engine 10 is provided with an engine speed sensor 11. Engine speed sensor 11 senses rotational speed Ne of crankshaft 18 of engine 10 (hereinafter also referred to as "engine speed"). Engine speed sensor 11 transmits to ECU 200 a signal indicating engine speed Ne sensed.

Power split device 40 mechanically couples together three elements for rotating driving wheel 80, i.e., driving shaft 16, crankshaft 18 of engine 10, and a rotation shaft of first MG 20. Power split device 40 utilizes any one of the above-indicated three elements as a reaction force element to allow the other two elements to transmit motive power therebetween. Second MG 30 has a rotation shaft coupled with driving shaft 16.

Power split device 40 is a planetary gear mechanism including a sun gear 50, pinion gears 52, a carrier 54, and a ring gear 56. Pinion gear 52 engages with sun gear 50 and ring gear 56. Carrier 54 supports pinion gears 52 rotatably and is also coupled with crankshaft 18 of engine 10. Sun gear 50 is coupled with the rotation shaft of first MG 20. Ring gear 56 is coupled via driving shaft 16 with the rotation shaft of second MG 30 and speed reducer 58.

Speed reducer 58 transmits motive power from power split device 40 and second MG 30 to driving wheel 80. In addition, speed reducer 58 transmits to power split device 40 and second MG 30 reaction force received by driving wheel 80 from a road surface.

PCU 60 includes a plurality of switching elements. PCU 60 has the switching elements turned on/off as controlled to convert dc power stored in battery 70 into ac power for driving first MG 20 and second MG 30. PCU 60 includes a converter and an inverter (both not shown) controlled in response to a control signal S2 issued from ECU 200. The converter receives dc power from battery 70, boosts it in voltage, and outputs it to the inverter. The inverter receives the dc power from the converter, converts it into ac power, and outputs it to first MG 20 and/or second MG 30. First MG 20 and/or second MG 30 are/is thus driven by using the electric power stored in battery 70. In addition, the inverter receives ac power generated by first MG 20 and/or second MG 30, converts it into dc power, and outputs it to the converter. The converter receives the dc power from the inverter, buck-converts it in voltage, and outputs it to battery 70. Battery 70 is thus charged with the electric power generated by first MG 20 and/or second MG 30. It is noted that the converter may be dispensed with.

Battery 70 is a power storage device and a rechargeable dc power supply. Battery 70 is electrically insulated from vehicular body 3. Battery 70 is a nickel hydride battery, a lithium ion battery or a similar rechargeable battery, for example. Battery 70 has a voltage of approximately 200 V, for example. Battery 70 may be charged with electric power supplied from an external power supply (not shown) other than electric power generated by first MG 20 and/or second MG 30 as described above. Note that battery 70 is not limited to a rechargeable battery, and may be anything that can generate dc voltage, such as a capacitor, a solar cell, and a fuel cell, for example.

Battery 70 is provided with a battery temperature sensor 156, a current sensor 158, and a voltage sensor 160.

Battery temperature sensor 156 senses temperature TB of battery 70 (hereinafter battery temperature TB). Battery temperature sensor 156 transmits a signal indicating battery temperature TB to ECU 200.

Current sensor 158 senses a current IB of battery 70. Current sensor 158 transmits a signal indicating current IB to ECU 200.

Voltage sensor 160 senses voltage VB of battery 70. Voltage sensor 160 transmits a signal indicating voltage VB to ECU 200.

ECU 200 estimates a state of charge (SOC) of battery 70 based on current IB, voltage VB, and battery temperature TB of battery 70. ECU 200 may estimate open circuit voltage (OCV) based on current IB, voltage VB, and battery temperature TB and estimate an SOC of battery 70 based on the estimated OCV and a prescribed map, for example. Alternatively, ECU 200 may accumulate a current charged to battery 70 and that discharged therefrom and estimate an SOC of battery 70 therefrom, for example.

Auxiliary battery 72 supplies an auxiliary load (e.g., an A/C compressor, ECU 200 or the like) with voltage lower than that which battery 70 has (e.g., 12 V). DC/DC converter 71 is connected to positive electrode line PL and negative electrode line NL. DC/DC converter 71 operates in response to a control signal received from ECU 200 and buck-converts voltage between positive electrode line PL and negative electrode line NL into a low voltage (for example of about 12V) and outputs it to auxiliary battery 72. Auxiliary battery 72 is thus charged by DC/DC converter 71.

A first resolver 12 is provided at first MG 20. First resolver 12 detects rotational speed Nm1 of first MG 20. First resolver 12 transmits to ECU 200 a signal indicating rotational speed Nm1 detected.

A second resolver 13 is provided at second MG 30. Second resolver 13 detects rotational speed Nm2 of second MG 30. Second resolver 13 transmits to ECU 200 a signal indicating rotational speed Nm2 detected.

A driving shaft 82 coupling speed reducer 58 and driving wheel 80 is provided with a wheel speed sensor 14. Wheel speed sensor 14 senses rotational speed Nw of driving wheel 80. Wheel speed sensor 14 transmits to ECU 200 a signal indicating rotational speed Nw sensed. ECU 200 calculates vehicular speed V based on rotational speed Nw received. It is noted that ECU 200 may calculate vehicular speed V based on rotational speed Nm2 of second MG 30 instead of rotational speed Nw.

Accelerator pedal 162 is provided near the driver's seat. Accelerator pedal 162 is provided with a pedal travel sensor 164. Pedal travel sensor 164 senses an amount AP traveled by accelerator pedal 162. Pedal travel sensor 164 transmits to ECU 200 a signal indicating amount AP traveled by accelerator pedal 162. Note that pedal travel sensor 164 may be replaced with a sensor for sensing force applied by the driver to step on accelerator pedal 162.

ECU 200 generates control signal S1 for controlling engine 10 and outputs the generated control signal S1 to engine 10. Furthermore, ECU 200 generates control signal S2 for controlling PCU 60 and outputs the generated control signal S2 to PCU 60. ECU 200 generates control signal S3 for controlling power supply circuit 112 and outputs the generated control signal S3 to power supply circuit 112.

By controlling engine 10, PCU 60 and the like, ECU 200 generally controls a hybrid system, i.e., how battery 70 should be charged/discharged and how engine 10, first MG 20 and second MG 30 should be operated, so that vehicle 1 can travel most efficiently.

ECU 200 calculates requested power Pv corresponding to amount AP traveled by accelerator pedal 162 provided near the driver's seat. In accordance with requested power Pv as calculated, ECU 200 controls torque of first MG 20 and that of second MG 30 and an output of engine 10.

When vehicle 1 having a configuration as described above starts off, travels slowly or the like and engine 10 is inefficient, the vehicle travels via second MG 30 alone. When the vehicle normally travels, power split device 40 splits the motive power of engine 10 into two paths of motive power, for example. Motive power in one path directly drives driving wheel 80. Motive power in the other path drives first MG 20 to generate electric power. At the time, ECU 200 uses the generated electric power to drive second MG 30. Second MG 30 thus driven assists driving wheel 80.

When vehicle 1 is decelerated, regenerative braking is performed with second MG 30, which follows the rotation of driving wheel 80, functioning as a generator. The regenerative braking recovers electric power which is in turn stored to battery 70. Note that when battery 70 is decreased in SOC and needs to be charged, ECU 200 increases the output of engine 10 to increase the amount of electric power generated by first MG 20. The SOC of battery 70 is thereby increased. Furthermore, ECU 200 may also perform control to increase the driving force provided from engine 10, as required, when the vehicle travels slowly. ECU 200 does so for example when: it is necessary to charge battery 70, as described above; an air-conditioner or a similar auxiliary load is driven; a coolant of engine 10, catalyst 154 and/or the like are/is heated to a prescribed temperature; and/or the like.

Figure 3:
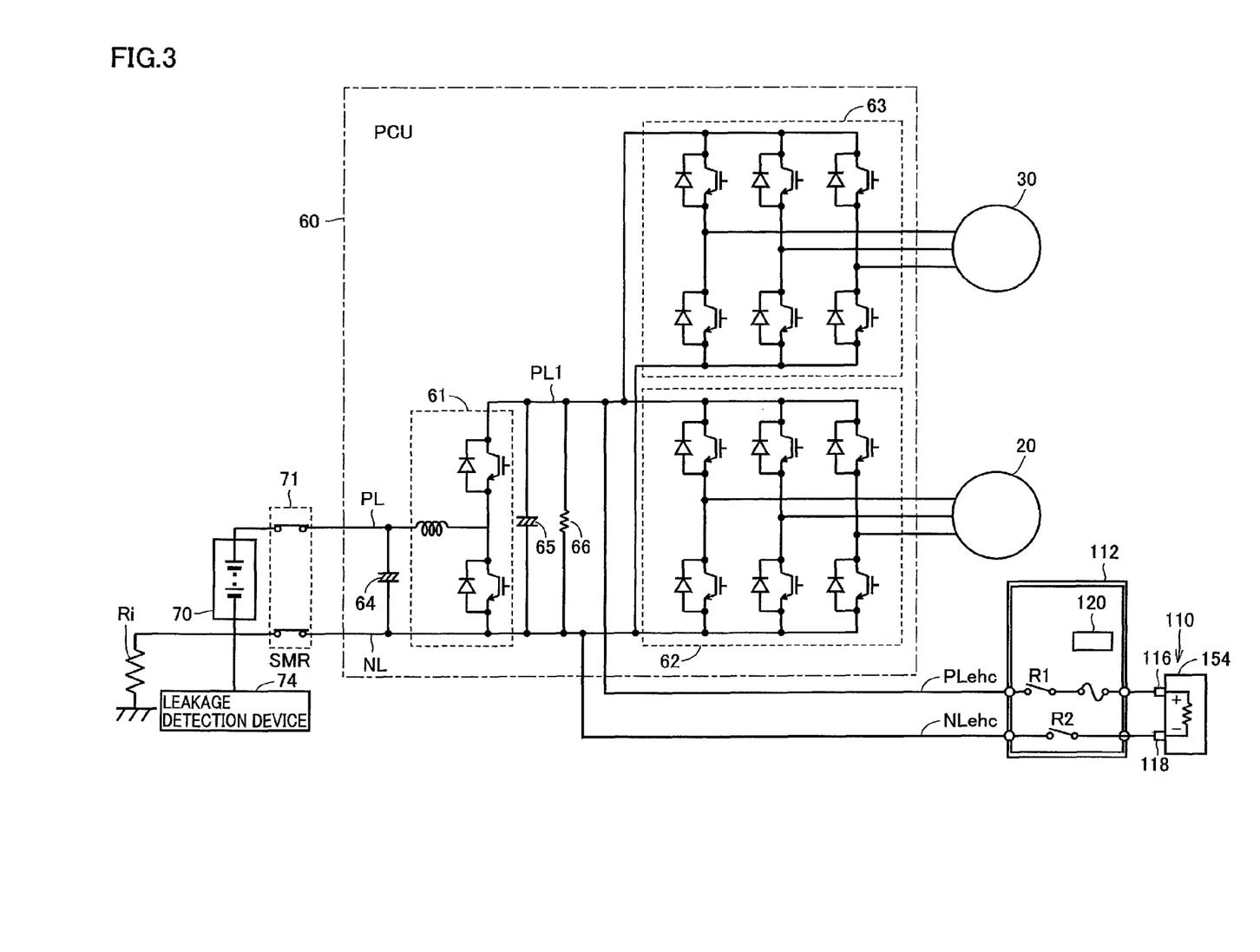
FIG. 3 shows a circuit configuration of a first MG, a second MG, a PCU, a battery, and an EHC.

FIG. 3 shows a circuit configuration of first MG 20, second MG 30, PCU 60, battery 70, and EHC 110.

A system main relay (SMR) 71 is provided between PCU 60 and battery 70. SMR 71 is controlled by a control signal issued from ECU 200 to switch supplying electric power between battery 70 and PCU 60 to interrupting electric power therebetween and vice versa.

PCU 60 includes a converter 61, inverters 62 and 63, smoothing capacitors 64 and 65, and a discharging resistance 66.

Converter 61 is connected to battery 70 via positive electrode line PL and negative electrode line NL. Furthermore, converter 61 is connected to inverters 62 and 63 via a positive electrode line PL1 and negative electrode line NL.

Converter 61 includes a reactor, two switching elements, and two diodes. Converter 61 is controlled by a control signal issued from ECU 200 to perform voltage conversion between battery 70 and inverters 62 and 63.

Inverter 62 is provided between converter 61 and first MG 20. Inverter 63 is provided between converter 61 and second MG 30. Inverters 62 and 63 are connected to converter 61 in parallel.

Inverters 62 and 63 each include 3-phase upper and lower arms (or switching elements), and a diode connected to each switching element in antiparallel. Inverters 62 and 63 have their upper and lower arms controlled by a control signal issued from ECU 200 to receive dc power converted in voltage by converter 61, convert it into ac power, and output it to first MG 20 and second MG 30, respectively.

Smoothing capacitor 64 is connected between positive electrode line PL and negative electrode line NL and smoothes an ac component of voltage variation between positive electrode line PL and negative electrode line NL. Smoothing capacitor 65 is connected between positive electrode line PL1 and negative electrode line NL and smoothes an ac component of voltage variation between positive electrode line PL1 and negative electrode line NL.

Discharging resistance 66 is connected between positive electrode line PL1 and negative electrode line NL. Discharging resistance 66 is applied to draw residual charge of smoothing capacitors 64 and 65.

EHC 110 is connected to a power line (positive electrode line PL1 and negative electrode line NL) between converter 61 and inverters 62 and 63. More specifically, positive electrode 116 is connected to a positive electrode branch line PLehc branched from positive electrode line PL1, and negative electrode 118 is connected to a negative electrode branch line NLehc branched from negative electrode line NL. Catalyst 154 is supplied with electric power of battery 70 boosted by converter 61 and catalyst 154 is thus heated by Joule's heat. Thus in the present embodiment battery 70 and converter 61 are used not only as a hybrid power supply (a power supply for driving second MG 30) but also as an EHC power supply (a power supply for heating catalyst 154). Furthermore, when vehicle 1 is braked, catalyst 154 is also heated by consuming electric power regenerated by first MG 20 and/or second MG 30 (more precisely, the regenerated electric power that has been converted into dc power by inverters 62 and 63).

Power supply circuit 112 is provided between EHC 110 and PCU 60. Power supply circuit 112 internally includes an EHC relay R1 provided on positive electrode branch line PLehc, an EHC relay R2 provided on negative electrode branch line NLehc, and a monitoring sensor 120 that monitors EHC 110 and EHC relays R1 and R2 in status. Monitoring sensor 120 uses values of voltage and current supplied to EHC 110 to calculate electric power consumed by EHC 110 (hereinafter also referred to as "the EHC's consumed electric power Pehc"), an estimated temperature of EHC 110, an electrical resistance value of EHC 110, and/or the like, and outputs a resultant calculation to ECU 200. Note that monitoring sensor 120 may have all or a portion of its function outside power supply circuit 112.

EHC relays R1, R2 are each opened/closed (or turned on/off) as controlled by a control signal issued from ECU 200. When EHC relays R1 and R2 are both closed, EHC 110 and PCU 60 are electrically connected and EHC 110 is thus supplied with electric power. EHC 110 thus supplied with electric power is turned on. EHC 110 turned on warms up catalyst 154 therein.

In contrast, when at least one of EHC relays R1 and R2 is opened, EHC 110 and PCU 60 are electrically disconnected, and supplying EHC 110 with electric power is stopped. EHC 110 no longer supplied with electric power is turned off.

Thus, ECU 200 controlling opening and closing EHC relays R1 and R2, i.e., a relatively simple and inexpensive configuration, switches supplying electric power to EHC 110 to interrupting electric power supplied thereto and vice versa.

A possible electric leakage path from a high pressure system is that from battery 70, a dc portion such as negative electrode line NL and/or the like, or EHC 110 to vehicular body 3, as indicated by an insulation resistance Ri.

Figure 4:
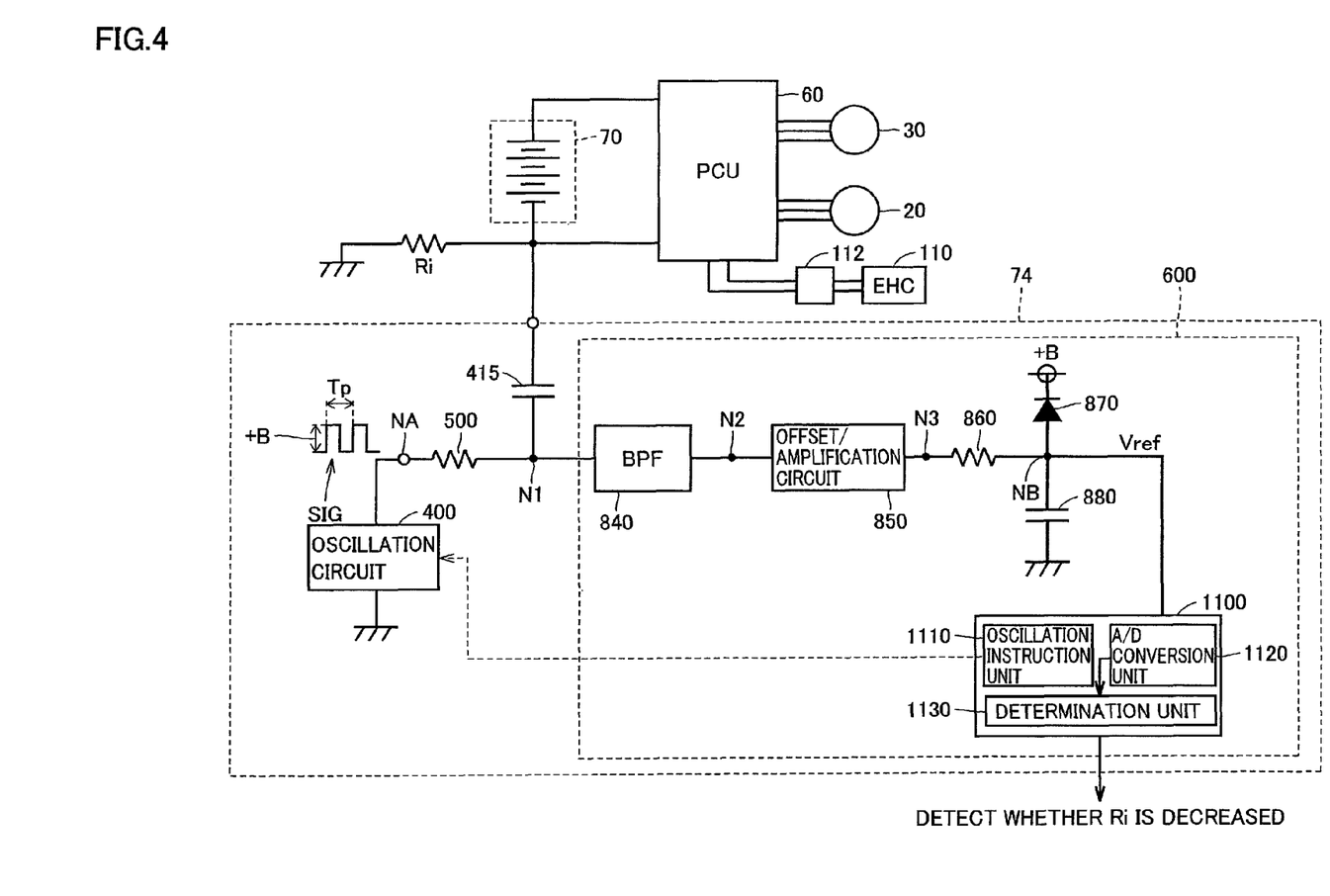
FIG. 4 shows a configuration of a leakage detection device.

Leakage detection device 74 detects whether insulation resistance Ri is decreased in such an electric leakage path. FIG. 4 is a circuit diagram more specifically showing a configuration of leakage detection device 74 shown in FIG. 3. Note that FIG. 4 shows a ground node, which corresponds to a body grounding in vehicle 1. Furthermore, FIG. 4 shows leakage detection device 74 in a configuration by way of example, and leakage detection device 74 is not limited to the configuration shown in FIG. 4.

Leakage detection device 74 includes an oscillation circuit 400 serving as a signal generation unit, a resistance 500 for detecting electric leakage, a coupling capacitor 415, and an impedance determination circuit 600.

Impedance determination circuit 600 includes a bandpass filter (BPF) 840, a circuit block 850 formed of an offset circuit and an amplification circuit, a resistance 860, an overvoltage protection diode 870, a capacitor 880, and a control circuit 1100.

Oscillation circuit 400 applies to a node NA a pulse signal SIG varying at a predetermined frequency (a predetermined cycle Tp). Resistance 500 is connected between node NA and a node N1. Coupling capacitor 415 is connected between node N1 and battery 70 subject to electric leakage detection. Bandpass filter 840 has an input terminal connected to node N1 and an output terminal connected to a node N2. Bandpass filter 840 has a passband frequency designed to correspond to the frequency of pulse signal SIG.

Circuit block 850 is connected between node N2 and a node N3. Circuit block 850 amplifies variation in voltage of the pulse signal that has passed through bandpass filter 840 and is around a threshold voltage set when electric leakage is detected. Overvoltage protection diode 870 has a cathode connected to a power supply node and an anode connected to a node NB, and removes a surge voltage (high voltage or negative voltage). Resistance 860 is connected between node N3 and node NB. Capacitor 880 is connected between node NB and a ground node. Resistance 860 and capacitor 880 function as a filter removing noise of a signal output from circuit block 850.

Control circuit 1100 controls oscillation circuit 400. In addition, control circuit 1100 detects a voltage at node NB and detects from detected voltage Vref whether insulation resistance Ri is decreased. Control circuit 1100 includes an oscillation instruction unit 1110, an A/D conversion unit 1120 and a determination unit 1130.

Oscillation instruction unit 1110 provides an instruction to oscillation circuit 400 to generate pulse signal SIG and also provides an instruction to change the duty ratio of pulse signal SIG. A/D conversion unit 1120 provides A/D conversion of the voltage at node NB detected at a predetermined sampling cycle Ts. Sampling cycle Ts is sufficiently shorter than cycle Tp of pulse signal SIG, and the maximum voltage (or peak voltage Vp) and the minimum voltage at node NB can be detected. Determination unit 1130 compares the value of peak voltage Vp obtained from A/D conversion unit 1120 with a threshold value. Control circuit 1100 thus detects whether insulation resistance Ri is decreased.

To detect whether insulation resistance Ri is decreased, an operation is performed, as will be described hereinafter. Oscillation circuit 400 generates pulse signal SIG which is in turn applied to a series circuit configured to include resistance 500, coupling capacitor 415, insulation resistance Ri, and bandpass filter 840. This generates at node N1 corresponding to a connection point of resistance 500 and coupling capacitor 415 a pulse voltage having a peak value of a value related to a product of a voltage division ratio of insulation resistance Ri and resistance 500 (a resistance value Rd), i.e., Ri/(Rd+Ri), and an amplitude of pulse signal SIG (a voltage +B serving as power supply voltage). It should be noted that while voltage +B may for example be a voltage of an auxiliary battery, voltage +B is not limited thereto.

The pulse voltage generated at node N1 has attenuated by bandpass filter 840 any component other than the frequency of pulse signal SIG. Of pulse signal SIG that has passed through bandpass filter 840, only variation in voltage around the threshold voltage is amplified by circuit block 850. Circuit block 850 outputs a signal which is in turn transmitted to node NB. When the signal is transmitted from node N3 to node NB, the signal has a surge voltage removed by overvoltage protection diode 870 and also has noise removed by resistance 860 and capacitor 880.

When insulation resistance Ri is normal, Ri>>Rd. As Ri increases, peak voltage Vp becomes substantially equal to voltage +B. In contrast, when insulation resistance Ri decreases, voltage division ratio: Ri/(Rd+Ri) decreases, and accordingly, peak voltage Vp decreases. By detecting peak voltage Vp decreased, degraded insulation (or electric leakage) can be detected. Detected resistance Rd is a fixed value, and insulation resistance Ri is calculated by observing peak voltage Vp.

When vehicle 1 thus configured has exhaust gas passing through EHC 110, mat 153 between catalyst 154 in EHC 110 and exhaust path 108 may have moisture, soot and/or the like accumulated therein. Furthermore, when mat 153 has an increased amount of moisture, soot and/or the like accumulated therein, the moisture, soot and/or the like may accumulate along a surface of insulating member 155 and result in reduced insulation resistance between catalyst 154 and exhaust path 108. If in such a condition EHC 110 is turned on, there may be electric leakage from EHC 110 to vehicular body 3.

Accordingly, the present embodiment provides ECU 200 characterized by performing heating control to control heating of EHC 110 when EHC 110 is not held insulated from vehicular body 3.

In the present embodiment, if a resistance value between EHC 110 and vehicular body 3 is smaller than a threshold value, ECU 200 performs vaporization control as the heating control to heat catalyst 154 until catalyst temperature Tc attains a first temperature Tc(1) to vaporize moisture between catalyst 154 and exhaust path 108.

Furthermore, if the vaporization control does not recover the insulation state between the electrical circuit and the vehicular body, ECU 200 performs soot oxidation control to heat catalyst 154 until catalyst temperature Tc attains a second temperature Tc(2) to oxidize soot between catalyst 154 and exhaust path 108. Second temperature Tc(2) is higher than first temperature Tc(1).

Figure 5:
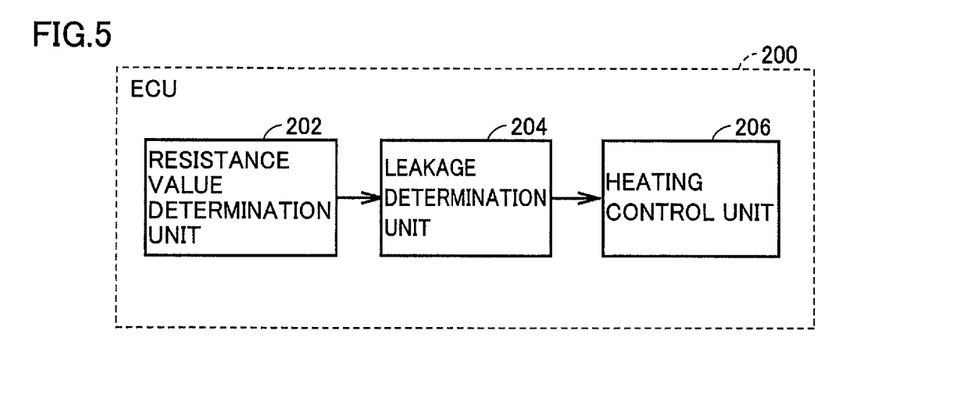
FIG. 5 is a functional block diagram of an ECU mounted in a vehicle according to the present embodiment.

FIG. 5 is a functional block diagram of ECU 200 mounted in vehicle 1 according to the present embodiment. ECU 200 includes a resistance value determination unit 202, a leakage determination unit 204, and a heating control unit 206.

Resistance value determination unit 202 determines whether insulation resistance Ri received from leakage detection device 74 is smaller than a threshold value Ri(0). Threshold value Ri(0) is a predetermined value for determining whether insulation resistance Ri is decreased. Furthermore, threshold value Ri(0) is set within: a range that does not allow electric leakage to be caused from EHC 110 to vehicular body 3 when EHC 110 is turned on; or a range allowing electric leakage to have only a limited effect.

Note that resistance value determination unit 202 may for example set on a resistance value determination flag when insulation resistance Ri is smaller than threshold value Ri(0).

If resistance value determination unit 202 determines that insulation resistance Ri is smaller than threshold value Ri(0), leakage determination unit 204 determines whether there is decreased insulation resistance attributed to moisture, soot and/or the like present between catalyst 154 in EHC 110 and exhaust path 108.

For example, if resistance value determination unit 202 determines that insulation resistance Ri is smaller than threshold value Ri(0), and at least one of relays R1 and R2 of power supply circuit 112 is closed, leakage determination unit 204 controls relays R1 and R2 to open both relays R1 and R2.

Leakage determination unit 204 uses leakage detection device 74, with relays R1 and R2 both open, to detect insulation resistance Ri. If insulation resistance Ri detected is equal to or larger than threshold value Ri(0), leakage determination unit 204 determines that there is decreased insulation resistance attributed to moisture, soot and/or the like present between catalyst 154 and exhaust path 108.

If insulation resistance Ri detected with relays R1 and R2 both open is smaller than threshold value Ri(0), leakage determination unit 204 determines that there is no decreased insulation resistance attributed to moisture, soot and/or the like present between catalyst 154 and exhaust path 108.

Furthermore, if resistance value determination unit 202 determines that insulation resistance Ri is smaller than threshold value Ri(0) and power supply circuit 112 has relays R1 and R2 both open, leakage determination unit 204 determines that there is no decreased insulation resistance attributed to moisture, soot and/or the like present between catalyst 154 and exhaust path 108.

For example, if resistance value determination unit 202 determines that insulation resistance Ri is smaller than threshold value Ri(0), leakage determination unit 204 may detect insulation resistance Ri(1) with relay R1 alone closed, insulation resistance Ri(2) with relay R2 alone closed, and insulation resistance Ri(3) with relays R1 and R2 both open, and if at least one of Ri(1) and Ri(2) is smaller than threshold value Ri(0) and Ri(3) is larger than threshold value Ri(0), leakage determination unit 204 may then determine that there is decreased insulation resistance attributed to moisture, soot and/or the like present between catalyst 154 and exhaust path 108.

Alternatively, for example, if resistance value determination unit 202 determines that insulation resistance Ri is smaller than threshold value Ri(0), leakage determination unit 204 may detect insulation resistance Ri(4) with relays R1 and R2 both closed and insulation resistance Ri(3) with relays R1 and R2 both open and if Ri(4) is smaller than threshold value Ri(0) and Ri(3) is larger than threshold value Ri(0), leakage determination unit 204 may then determine that there is decreased insulation resistance attributed to moisture, soot and/or the like present between catalyst 154 and exhaust path 108.

Note that for example if the resistance value determination flag is set on, leakage determination unit 204 determines whether there is decreased insulation resistance attributed to moisture, soot and/or the like present between catalyst 154 in EHC 110 and exhaust path 108. Furthermore, when it is determined that there is decreased insulation resistance attributed to moisture, soot and/or the like present between catalyst 154 in EHC 110 and exhaust path 108, leakage determination unit 204 may set on a leakage determination flag.

When leakage determination unit 204 determines that there is decreased insulation resistance attributed to moisture, soot and/or the like present between catalyst 154 in EHC 110 and exhaust path 108, heating control unit 206 controls heating of EHC 110. Heating control unit 206 for example turns on EHC 110 to heat catalyst 154.

In the present embodiment when leakage determination unit 204 determines that there is decreased insulation resistance attributed to moisture, soot and/or the like present between catalyst 154 and exhaust path 108, heating control unit 206 performs the vaporization control.

The vaporization control is applied to heat catalyst 154 until catalyst temperature Tc attains first temperature Tc(1) to vaporize moisture between catalyst 154 and exhaust path 108. First temperature Tc is equal to or higher than 100 degrees centigrade for example.

Heating control unit 206 may perform the vaporization control to heat catalyst 154 until catalyst temperature sensor 114 senses that catalyst temperature Tc attains first temperature Tc(1), or alternatively to heat catalyst 154 by turning on EHC 110 until a predetermined first period of time elapses.

Note that the predetermined first period of time is a period of time set to allow catalyst temperature Tc to attain first temperature Tc(1) or higher.

After the vaporization control is performed, heating control unit 206 determines whether the insulation state between vehicular body 3 and EHC 110 has been recovered.

More specifically, after the vaporization control is performed when a predetermined period of time elapses and insulation resistance Ri is still held smaller than threshold value Ri(0) heating control unit 206 determines that the insulation state is not recovered.

In contrast, after the vaporization control is performed when or before the predetermined period of time elapses and insulation resistance Ri is equal to or larger than threshold value Ri(0) heating control unit 206 determines that the insulation state is recovered. Note that it is assumed that at least one of relays R1 and R2 of power supply circuit 112 is closed. Once it is determined that the insulation state is recovered, heating control unit 206 ends the heating control.

When heating control unit 206 determines that after the vaporization control is performed the insulation state between vehicular body 3 and EHC 110 is not recovered, heating control unit 206 performs the soot oxidation control.

The soot oxidation control is applied to heat catalyst 154 until catalyst temperature Tc attains second temperature Tc(2) to oxidize soot between catalyst 154 and exhaust path 108. Second temperature Tc(2) ranges from 500 degrees centigrade to 600 degrees centigrade.

Heating control unit 206 may perform the soot oxidation control to heat catalyst 154 until catalyst temperature sensor 114 senses that catalyst temperature Tc attains second temperature Tc(2), or alternatively to heat catalyst 154 by turning on EHC 110 until a predetermined second period of time elapses. Note that the predetermined second period of time is a period of time set to allow catalyst second temperature Tc after the soot oxidation control to attain second temperature Tc(2) or higher.

Heating control unit 206 ends the heating control after the second period of time elapses. Heating control unit 206 may perform the heating control for example when the leakage determination flag is set on.

The present embodiment has been described such that heating control unit 206 performs the vaporization control and thereafter if the insulation state between vehicular body 3 and EHC 110 is not recovered then heating control unit 206 performs the soot oxidation control. However, heating control unit 206 is not limited as such. Heating control unit 206 may perform the soot oxidation control for example when leakage determination unit 204 determines that there is decreased insulation resistance attributed to moisture, soot and/or the like present between catalyst 154 and exhaust path 108.

Alternatively, when the soot oxidation control recovers the insulation state more frequently than the vaporization control does, heating control unit 206 may perform the soot oxidation control more preferentially than the vaporization control.

While the present embodiment has been described such that resistance value determination unit 202, leakage determination unit 204, and heating control unit 206 all function as software implemented when a CPU of ECU 200 executes a program stored in a memory, the units may be implemented by hardware. Note that such a program is stored in a storage medium and thus mounted in vehicle 1.

Figure 6:
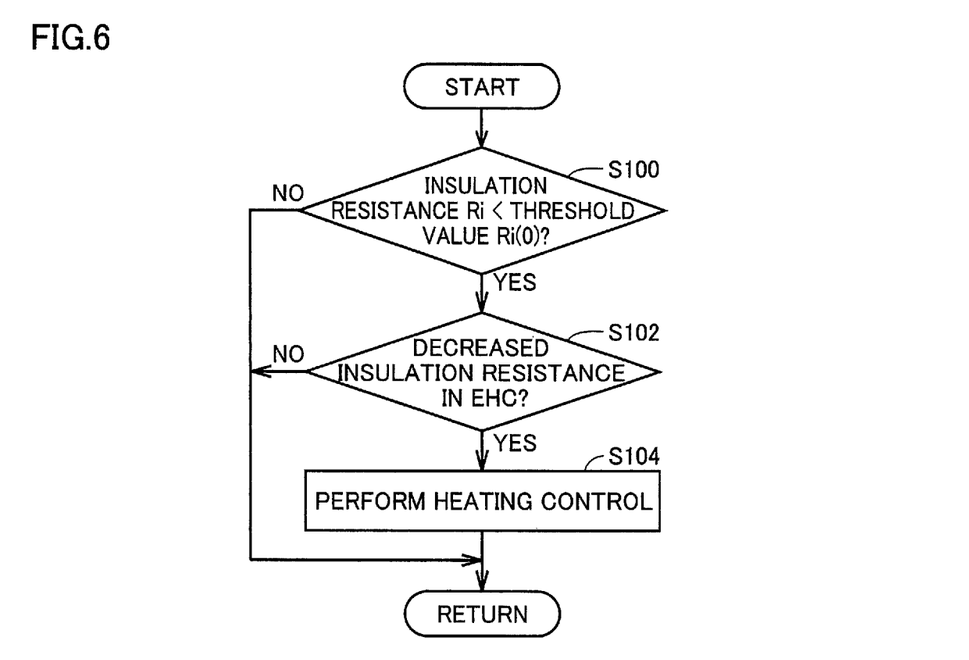
FIG. 6 is a flowchart of a program executed by an ECU mounted in a vehicle according to the present embodiment.

Reference will be made to FIG. 6 to describe a control structure of a program executed by ECU 200 mounted in vehicle 1 according to the present embodiment.

In Step (S) 100, ECU 200 determines whether insulation resistance Ri received from leakage detection device 74 is smaller than threshold value Ri(0). If insulation resistance Ri is smaller than threshold value Ri(0) (YES in S100), the control proceeds to S102. Otherwise (NO in S100), the process ends.

In S102, ECU 200 determines whether there is decreased insulation resistance attributed to moisture, soot and/or the like present between catalyst 154 in EHC 110 and exhaust path 108. If there is decreased insulation resistance attributed to moisture, soot and/or the like present between catalyst 154 in EHC 110 and exhaust path 108 (YES in S102), the control proceed to S104. Otherwise (NO in S102), the process ends. In S104, ECU 200 performs the heating control. The heating control has been described above, and will not be described repeatedly.

An operation of ECU 200 mounted in vehicle 1 according to the present embodiment will be described based on the above structure and flowchart.

For example, engine 10 is stopped for the sake of illustration. While engine 10 is stopped, condensation or the like occurs and moisture is accumulated in mat 153 between exhaust path 108 and catalyst 154. Furthermore, in operation before engine 10 is stopped, soot in exhaust gas is accumulated in mat 153. If in such a case leakage detection device 74 detects insulation resistance Ri, and insulation resistance Ri detected is smaller than threshold value Ri(0) (YES in S100), whether there is decreased insulation resistance attributed to moisture, soot and/or the like present between catalyst 154 in EHC 110 and exhaust path 108, is determined (S102).

For example, if relays R1 and R2 are both opened, and insulation resistance Ri is equal to or larger than threshold value Ri(0), then it is determined that there is decreased insulation resistance attributed to moisture, soot and/or the like present between catalyst 154 in EHC 110 and exhaust path 108.

If there is decreased insulation resistance attributed to moisture, soot and/or the like present between catalyst 154 in EHC 110 and exhaust path 108 (YES in S102), the heating control is performed (S104).

The vaporization control can be performed to raise catalyst temperature Tc to first temperature Tc(1) to vaporize moisture in mat 153. At the time if insulation resistance Ri is equal to or larger than threshold value Ri(0), The insulation state between EHC 110 and vehicular body 3 has been recovered and accordingly, the heating control ends.

In contrast, after the vaporization control is performed when the first period of time elapses and insulation resistance Ri is still held smaller than threshold value Ri(0), the soot oxidation control is performed.

The soot oxidation control can be performed to raise catalyst temperature Tc to second temperature Tc(2) to oxidize soot in mat 153. Mat 153 can thus have its internal moisture and soot vaporized and oxidized, respectively, to recover the insulation state between EHC 110 and vehicular body 3. After the soot oxidation control is performed when the second period of time elapses the heating control ends.

Thus the present embodiment provides a vehicle such that when the insulation state between EHC 110 and vehicular body 3 is not held the heating control can be performed to heat catalyst 154 to vaporize moisture between exhaust path 108 and catalyst 154 and oxidize soot therebetween. This can recover the insulation state between EHC 110 and vehicular body 3. This can minimize/prevent electric leakage between EHC 110 and vehicular body 3. A vehicle and vehicular control method can thus be provided that can minimize/prevent electric leakage in a catalyst device heated with electric power.

Furthermore, if insulation resistance Ri is smaller than threshold value Ri(0), the vaporization control can be performed to recover the insulation state between catalyst 154 and exhaust path 108 with a smaller power consumption and in a shorter period of time than the soot oxidation control.

Furthermore, after the vaporization control is performed or if insulation resistance Ri is smaller than threshold value Ri(0), the soot oxidation control can be performed to vaporize moisture between exhaust path 108 and catalyst 154 and oxidize soot therebetween. This can recover the insulation state between catalyst 154 and vehicular body 3 more reliably than when the vaporization control is performed.

In the present embodiment the vaporization control and the soot oxidation control are both performed by turning on EHC 110. However, they are not limited to using EHC 110. For example, at least one of the vaporization control and the soot oxidation control may be performed by controlling when to ignite engine 10 and the amount fuel to be injected.

When to ignite engine 10 is controlled by retarding when to ignite engine 10 to be later than when to ignite engine 10 as set based on a state that engine 10 has when the vaporization control or the soot oxidation control is not performed.

The amount fuel to be injected is controlled by increasing the amount of fuel injected to engine 10 to be larger than that of fuel injected thereto which is set based on a state that engine 10 has when the vaporization control or the soot oxidation control is not performed.

Furthermore, while in the present embodiment whether the insulation state between EHC 110 and vehicular body 3 is held is determined based on insulation resistance Ri, it is not limited to being determined based on an insulation resistance value. For example, ECU 200 may determine that the insulation state is held when a current passing between EHC 110 and vehicular body 3 is smaller than a threshold value and that the insulation state is not held when the current is larger than the threshold value.

Note that when at least one of insulation resistance Ri(1) with relay R1 alone closed and Ri(2) with relay R2 alone closed is smaller than threshold value Ri(0) and insulation resistance Ri(3) with relays R1 and R2 both open is larger than threshold value Ri(0), the resistance value detected by leakage detection device 74 indicates a resistance value between EHC 110 and vehicular body 3.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

REFERENCE SIGNS LIST

1: hybrid vehicle; 3: vehicular body; 10: engine; 11: engine speed sensor; 12, 131: resolver; 14: wheel speed sensor; 16: driving shaft; 18: crankshaft; 20, 30: MG; 40: power split device; 50: sun gear; 52: pinion gear; 54: carrier; 56: ring gear; 58: speed reducer; 60: PCU; 61, 71: converter; 62, 63: inverter; 64, 65: smoothing capacitor; 66: discharging resistance; 70: battery; 72: auxiliary battery; 74: leakage detection device; 80: driving wheel; 82: drive shaft; 102: cylinder; 104: fuel injection device; 106: exhaust manifold; 108: exhaust path; 110: ECU; 112: power supply circuit; 114: catalyst temperature sensor; 116: positive electrode;

118: negative electrode; 120: monitoring sensor; 153: mat; 154: catalyst; 155: insulating member; 156: battery temperature sensor; 158: current sensor; 160: voltage sensor; 162: accelerator pedal; 164: pedal travel sensor; 200: ECU; 202: resistance value determination unit; 204: leakage determination unit; 206: heating control unit; 400: oscillation circuit; 415: coupling capacitor; 500, 860: resistance; 600: impedance determination circuit; 840: bandpass filter; 850: circuit block; 870: overvoltage protection diode; 880: capacitor; 1100: control circuit; 1110: oscillation instruction unit; 1120: A/D conversion unit; 1130: determination unit.

The invention claimed is:

1. A vehicle comprising:
an engine;
a battery electrically insulated from a vehicular body;
a catalyst device heated with electric power of said battery to purify exhaust gas of said engine, the catalyst device being configured to be electrically insulated from said vehicular body; and
a controller configured to perform heating control to heat said catalyst device using electric power from said battery when an insulation state is not maintained between said catalyst device and said vehicular body, the heating control performed by the controller including (i) performing vaporization control that heats said catalyst device by supplying said catalyst device with electric power when a resistance value is smaller than a threshold value, the controller performing the vaporization control until a catalyst of said catalyst device attains a first temperature; and (ii) if the vaporization control does not recover said insulation state, performing soot oxidation control to heat said catalyst device until said catalyst attains a second temperature that is higher than the first temperature, the second temperature being sufficient to oxidize soot between said catalyst device and said exhaust path.

2. The vehicle according to claim 1, further comprising a leakage detector configured to detect said resistance value, said resistance value being between said catalyst device and said vehicular body.

3. The vehicle according to claim 2, wherein said first temperature is sufficient to vaporize moisture between said catalyst device and an exhaust path of said engine.

4. The vehicle according to claim 2, further comprising a rotating electric machine configured to receive electric power from said battery to cause the vehicle to travel.

5. A vehicular control method for a vehicle,
the vehicle including:
an engine,
a battery electrically insulated from a vehicular body, and
a catalyst device heated with electric power of said battery to purify exhaust gas of said engine, said catalyst device being configured to be electrically insulated from said vehicular body,
the method comprising the steps of:
determining whether an insulation state is maintained between said catalyst device and said vehicular body; and
performing heating control to heat said catalyst device using electric power from said battery when said insulation state is not maintained between said catalyst device and said vehicular body,
wherein the heating control includes (i) performing vaporization control that heats said catalyst device by supplying it with electric power when a resistance value is smaller than a threshold value, said vaporization control being performed until a catalyst of said catalyst device attains a first temperature; and (ii) if the vaporization control does not recover said insulation state, performing soot oxidation control to heat said catalyst device until said catalyst attains a second temperature that is higher than the first temperature, the second temperature being sufficient to oxidize soot between said catalyst device and said exhaust path.

* * * * *